United States Patent [19]
Fujioka et al.

[11] Patent Number: 5,828,443
[45] Date of Patent: Oct. 27, 1998

[54] DISTANCE MEASURING APPARATUS

[75] Inventors: Hiroshi Fujioka; Shoichi Tanaka, both of Tokyo, Japan

[73] Assignee: Mitsubishi Denki Kabushiki Kaisha, Tokyo, Japan

[21] Appl. No.: 607,512

[22] Filed: Feb. 27, 1996

[30] Foreign Application Priority Data

Jul. 31, 1995 [JP] Japan .................................. 7-195219

[51] Int. Cl.⁶ .............................. G01C 3/08; G01S 13/08
[52] U.S. Cl. ...................... 356/5.08; 342/134; 342/135
[58] Field of Search .......................... 356/5.08; 342/134, 342/135

[56] References Cited

U.S. PATENT DOCUMENTS

| | | |
|---|---|---|
| 3,618,089 | 11/1971 | Moran . |
| 3,630,616 | 12/1971 | Everest .................................. 356/5.08 |
| 3,666,367 | 5/1972 | Farnsworth et al. ................... 356/5.08 |
| 4,477,184 | 10/1984 | Endo . |
| 5,243,553 | 9/1993 | Flockencier ........................... 356/5.08 |

FOREIGN PATENT DOCUMENTS

| | | |
|---|---|---|
| 0427969 | 5/1991 | European Pat. Off. . |
| 3041272 | 6/1982 | Germany . |
| 3311727 | 11/1983 | Germany . |
| 618666 | 1/1994 | Japan . |

*Primary Examiner*—Stephen C. Buczinski
*Attorney, Agent, or Firm*—Sughrue, Mion, Zinn, Macpeak & Seas, PLLC

[57] ABSTRACT

Disclosed herein is a distance measuring apparatus comprising an irradiation unit for generating an electromagnetic wave, a receiving unit for receiving a reflected wave of the electromagnetic wave reflected by an object of measurement and generating a reception signal, and a propagation delay time measuring unit for measuring a propagation delay time by counting the number of pulses of a pulse train having a predetermined frequency. The propagation delay time is the time between the time that the irradiation unit irradiates the electromagnetic wave and the time that the reflected wave is received by the receiving unit. The vehicle distance measuring apparatus further comprises an electric discharge unit for performing an electric discharge from the time that the reflected wave is received by the receiving unit, a discharge-voltage measuring unit for measuring a discharge voltage of the discharge unit, and a distance computing unit for correcting the counted number of pulses, based on the propagation delay time and the measured discharge voltage, and computing a distance to the object.

6 Claims, 7 Drawing Sheets

DISTANCE MEASURING APPARATUS

BACKGROUND OF THE INVENTION

1. Field of the Invention

The present invention relates to a distance measuring apparatus that measures a distance between a vehicle and an object existing around the vehicle.

2. Description of the Related Art

Figure 6:
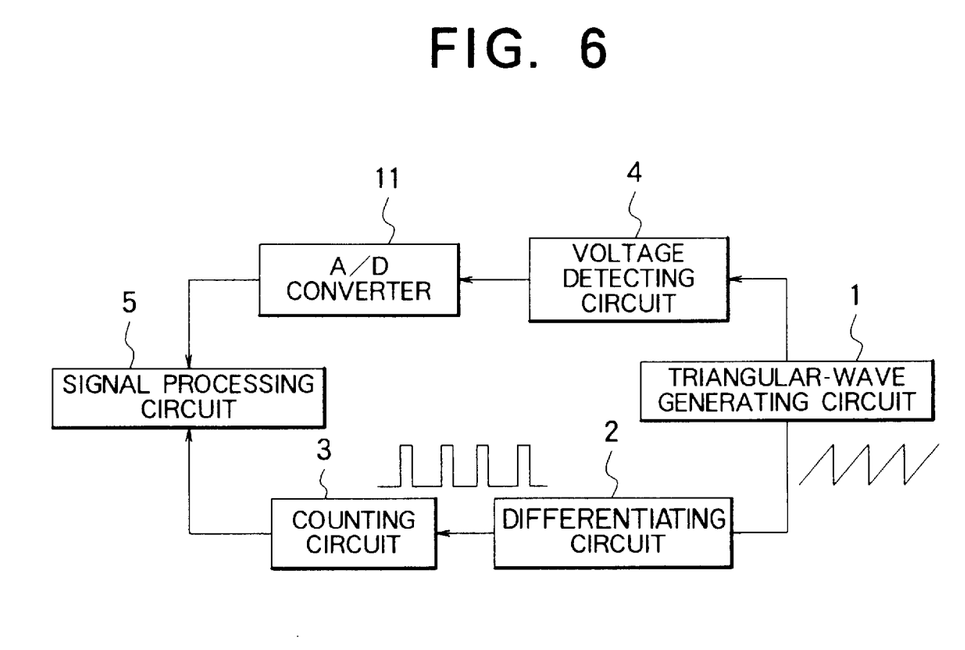
FIG. 6 is a block diagram showing a conventional distance measuring apparatus.

FIG. 6 shows a block diagram of a conventional distance measuring apparatus. In the figure, a triangular-wave generating circuit 1 outputs a triangular wave to a voltage detecting circuit 4 and a differentiating circuit 2 upon irradiation of an electromagnetic wave. The triangular-wave generating circuit 1 is connected to a differentiating circuit 2, whereby the triangular wave from the triangular-wave generating circuit 1 is converted to a pulsed signal. The differentiating circuit 2 is connected to a counting circuit 3, whereby the number of pulses of the pulsed signal converted by the differentiating circuit 2 is counted. The triangular-wave generating circuit 1 is also connected to a voltage detecting circuit 4, which detects the voltage of the triangular wave when the wave reflected by the object is received, and then outputs the detected voltage to an A/D converter 11. The count number of the counting circuit 3 and the voltage value of the voltage detecting circuit, output by the A/D converter 11, are input to a signal processing circuit 5, in which the count number and the voltage value are converted to distances, respectively, to compute a distance to the object.

Figures 7A, 7B, 7C, 7D:
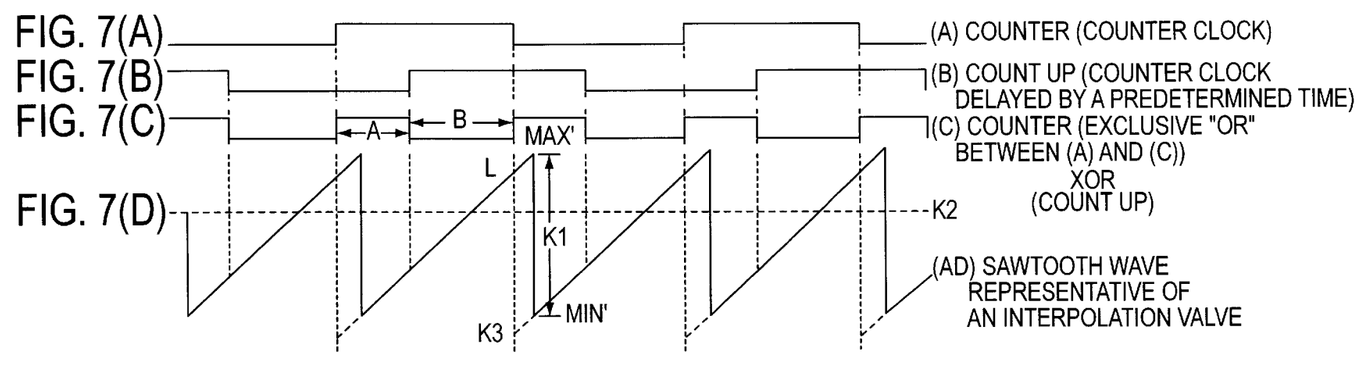

FIGS. 7(A–D) are a timing chart showing the operation of the conventional distance measuring apparatus. The operation of the conventional apparatus will hereinafter be described according to this timing chart. In FIGS. 7(A–D), "COUNTER" denotes a counter clock; "COUNT UP" denotes a counter clock delayed by a fixed time; and "AD" denotes a sawtooth wave representative of an interpolation value of the measured distance obtained by the counter. The interpolation value represented by the sawtooth wave AD must vary in synchronization with the counter clock, and the sawtooth wave AD has a delay time caused by circuit devices. Therefore, it is necessary to remove the delay time by computation.

As a method of removing the delay time, it has hitherto been performed to move the maximum value MAX' of the sawtooth wave AD to a position of L shown in FIGS. 7(A–D) and the minimum value MIN' to a position of K3. This movement will be performed as follows. First, the exclusive OR (XOR) between the counter clock (COUNTER) and the delayed counter clock (COUNT UP) is computed and divided into a range (A) where the delay time is removed by computation of the AD interpolation value and a range (B) where the delay time is not removed. Then, an appropriate value between L and MIN' is determined as a reference value (K2) for removing the delay time. When the AD interpolation value before removing the delay time is greater than K2 and also when the point where the interpolation value was obtained is within the logic high region of the aforementioned exclusive OR, i.e., within the range (A) where the delay time is removed by computation of the AD interpolation value, a value K1 obtained by subtracting the minimum value MIN' of the AD interpolation value from the maximum value MAX' is subtracted from the AD interpolation value. On the other hand, when the point where the interpolation value was obtained is within the logic high region of the aforementioned exclusive OR, i.e., within the range (A) where the delay time is removed by computation of the AD interpolation value and also when the AD interpolation value before removing the delay time is less than K2, the AD interpolation value is used as it is. Furthermore, when the AD interpolation value is obtained in the logic low region of the aforementioned exclusive OR, i.e., within the range (B) where the delay time is not removed, the AD interpolation value is used as it is, whether the interpolation value is greater than K2 or less than K2. In this way, the delay time of the AD interpolation value can be removed over the entire range.

The conventional distance measuring apparatus has the following disadvantages, because a distance is obtained as described above. That is, in the interpolation of a counting means having a large count cycle, such as a counter used in the measurement of a propagation delay time, the measured value of the interpolated time varies when the voltage level used for interpolation varies, and consequently, an error occurs in a measured distance.

In addition, there is possibility that a variation in the propagation delay time of an electromagnetic wave will take place due to temperature change, etc., and such a variation in the propagation delay time also causes an error in a measured distance.

BRIEF SUMMARY OF THE INVENTION

The objective of the present invention is to provide a distance measuring apparatus which is capable of accurately measuring a distance to an object.

To achieve this end and in accordance with an important aspect of the present invention, there is provided a distance measuring apparatus, comprising: irradiation means for generating an electromagnetic wave toward an object of measurement; receiving means for receiving a reflected wave of said electromagnetic wave reflected by said object of measurement and generating a reception signal; propagation delay time measuring means for measuring a propagation delay time by counting the number of pulses of a pulse train having a predetermined frequency, the propagation delay time being the time between the time that said irradiation means irradiates said electromagnetic wave and the time that said reflected-wave is received by said receiving means; electric discharge means for performing an electric discharge from the time that said reflected wave is received by said receiving means; discharge-voltage measuring means for measuring a discharge voltage of said discharge means; and distance computing means for correcting the counted number of pulses, based on said propagation delay time and the measured discharge voltage, and computing a distance to said object.

In a preferred form of the invention, said measured discharge voltage is a voltage at the time when the pulse of said pulse train is generated for the first time after said reflected wave is received by said receiving means. The distance measuring apparatus further comprises: maximum and minimum voltage detecting means for detecting a first voltage before said electric discharge of said electric discharge means and also detecting a second voltage after the electric discharge in a case where said electric discharge means discharged electricity over one pulse of said pulse train, or a value near said second voltage; and correction means for correcting the distance that is computed by said distance computing, based on the voltages detected by said maximum and minimum voltage detecting means.

With this arrangement, a variation in a measured distance caused by the influence of noise, etc., can be prevented and therefore a measurement of distance can be made with high reliability.

In another preferred form of the invention, the maximum and minimum voltages, which are detected by said maximum and minimum voltage detecting means, are stored and updated.

With this arrangement, even in a case where a propagation delay time is different from the original time because of environmental temperature change, a correction can be made and a distance to an object can be accurately measured.

In still another preferred form of the invention, said electric discharge means performs an electric discharge until the pulse of said pulse train is generated for the first time after said reflected wave is received by said receiving means.

In a further preferred form of the invention, the vehicle distance measuring apparatus further comprises: reference distance signal generating means for generating a reference distance signal having a fixed delay time; and correction means for comparing a distance calculated based on said reference distance signal by said distance computing means with said reference distance and correcting the distance computed by said distance computing means, based on a result of the comparison.

In a further preferred form of the invention, the calculation of the distance based on said reference distance signal is performed when a measurement of distance to said object is not made.

With this arrangement, even in a case where the voltage level of the discharge circuit varies, at the time of the discharge stop, due to noise or even in a case where a propagation delay time is different from the original time because of environmental temperature change, a correction can be made and a distance to an object can be accurately measured.

BRIEF DESCRIPTION OF THE DRAWINGS

The above and other objects and advantages will become apparent from the following detailed description when read in conjunction with the accompanying drawings wherein:

FIGS. 2(A–D) are an operational waveform diagram showing how the distance measuring apparatus of the first embodiment is operated;

FIGS. 4(A–F) are an operational waveform diagram showing how the distance measuring apparatus of the second embodiment is operated;

FIGS. 7(A–D) are an operational waveform diagram showing how the conventional distance measuring apparatus is operated.

DETAILED DESCRIPTION OF THE PREFERRED EMBODIMENTS

First Embodiment

Figure 1:
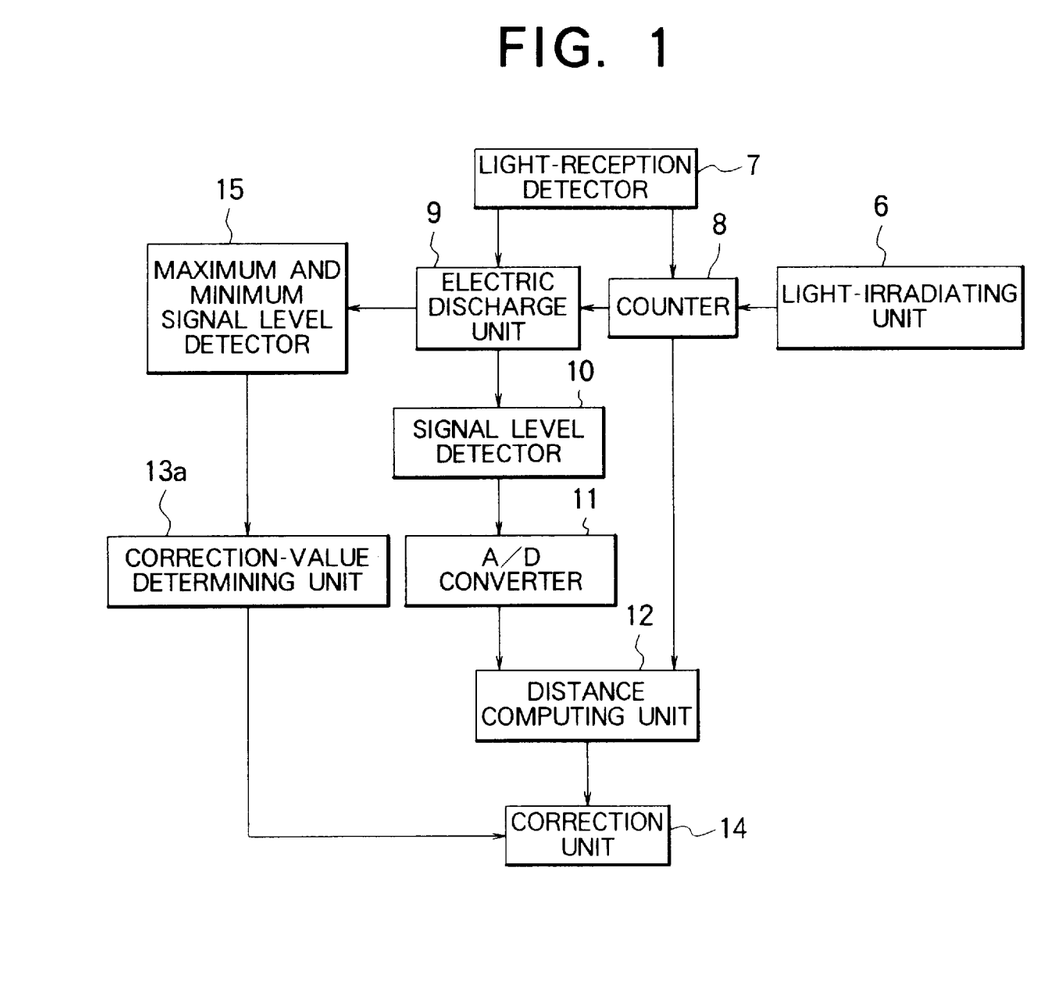
FIG. 1 is a block diagram showing a distance measuring apparatus of a first embodiment of the present invention.

Referring now to FIG. 1, there is shown a distance measuring apparatus in accordance with a first embodiment of the present invention. The distance measuring apparatus is mounted on a vehicle and equipped with a light-irradiating unit 6 which is irradiation means for irradiating an electromagnetic wave, a light-reception detector 7 which is reception means for detecting a reflected wave from an object of measurement (not shown) to which the electromagnetic wave is irradiated by the light-irradiating unit 6, a counter 8 which increments its count by one at fixed intervals of time in order to count the time from the irradiation start of the electromagnetic wave to the detection of the reflected wave, and an electric discharge unit 9 constituted, for example, by an RC discharge circuit, for interpolating the time counted by the counter. The distance measuring apparatus is also equipped with a signal level detector 10 for detecting a voltage level of the electric discharge unit 9 at the count-up time when discharging of electricity is performed from the time that the electric discharge unit 9 detects the reflected wave to the first count-up time after that detection, an A/D converter 11 for converting the signal level detected by the signal level detector 10 to a digital value, and a distance computing unit 12 for computing a distance to the object of measurement from both the count value counted by the counter 8 and the discharge signal level converted to the digital value.

The distance measuring apparatus is further equipped with a maximum and minimum signal level detector 15 for detecting the maximum value (voltage before discharging) and minimum value (voltage after the discharging when the discharge unit 9 discharges electricity over one pulse of a counter pulse train, or a value near the voltage) of a voltage level discharged for a certain time by the discharge unit 9, a correction-value determining unit 13a for determining a correction value of a distance with the signal level detected by the maximum and minimum signal level detector 15, and a correction unit 14 for correcting the distance computed by the distance computing unit 12 with the correction value determined by the correction-value determining unit 13a.

Figure 2A:
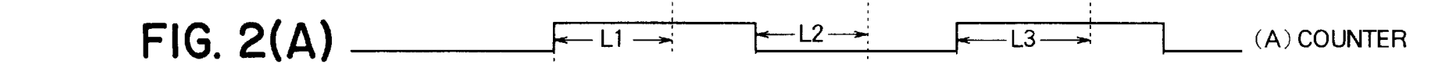
Figure 2B:
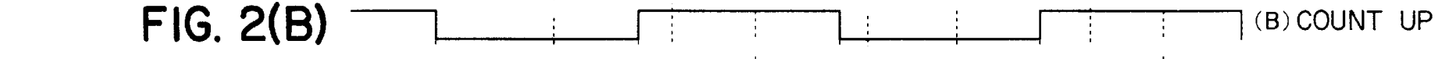
Figures 2C, 2D:
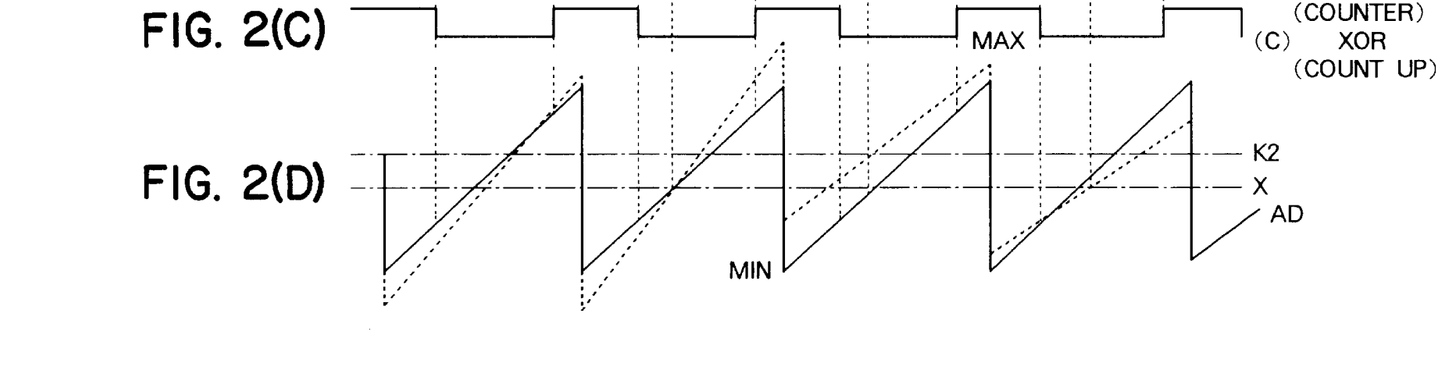

The operation of the first embodiment will hereinafter be described in reference to FIGS. 1 and 2(A–D). FIGS. 2(A–D) are a waveform diagram showing how the measuring apparatus of the first embodiment is operated. The light-irradiating unit 6 irradiates an electromagnetic wave and at the same time transmits an irradiation start signal to the counter 8 which is a counting unit. The counter 8, if receiving the irradiation start signal, starts to count up a counter clock. The electromagnetic wave, emitted from the light-irradiating unit 6, is reflected by an object of measurement, and the reflected wave is detected by the light-reception detector 7. The detected signal causes the counter 8 to stop counting and the discharge unit 9 to start the electric discharge for interpolating a distance that is measured by the counter 8. The electric discharge in this embodiment is performed from the time that the reflected wave is received till the count-up time that the counter 8 counts up for the first time (counting has not been started yet).

If the electric discharge is stopped at the count-up time, the voltage level at the time of the electric discharge stop will be detected by the signal level detector 10 and converted to a digital value by the A/D converter 11. At this time, the maximum and minimum signal level detector 15 detects and judges whether the voltage level of the discharge unit 9 has reached the minimum signal level (when the voltage level is less than the minimum signal level already detected, stored, and updated). When the voltage level has reached the minimum signal level, the value is stored and updated as the minimum signal level. If, on the other hand, the voltage level is not the minimum signal level, the subsequent processes will be performed with the previous minimum signal level that has already been obtained in the previous measurement. For the maximum signal level, the voltage before the discharging of the discharge unit 9, detected by the maximum and minimum signal level detector 15, is used.

Further describing the subsequent processes, the distance computing unit 12 interpolates the count value of the counter 8 with the value of the signal level detector 10 obtained from the A/D converter 11 and then computes a distance to an object of measurement. In the computation of the distance computing unit 12, the interpolation value can be obtained, for example, by dividing the discharge voltage V obtained in the signal level detector 10 by a predetermined span value between the maximum and minimum signals. Then, the correction-value determining unit 13a computes a correction value for correcting the distance obtained by the aforementioned distance computing unit 12 by using the maximum and minimum signal levels obtained by the maximum and minimum signal level detector 15. With the correction value obtained in the correction-value determining unit 13a, the correction unit 14 performs a correction computation of the measured distance computed by the distance computing unit 12. The correction computation can be performed, for example, by dividing the predetermined span value used in the interpolation of the distance computing unit 12 by the distance between the maximum and minimum signal levels actually obtained in the maximum and minimum signal level detector 15 and then by multiplying the interpolation value obtained in the distance computing unit 12 by the value obtained in the division. Of course, a computing method such as this is merely shown as an example and therefore it is apparent to those having skill in the art that various kinds of distance computing methods can be performed by using the value of the counter 8, the value of the signal level detector 10, and the value of the maximum and minimum signal level detector 15. As described above, the aforementioned distance computation and correction computation will be performed in the following distance computation equation by changing "MAX" and "MIN" as occasion demands.

$$R = 7.5C + 7.5\Delta V/(MAX - MIN)$$

where R is the distance to an object of measurement (m), C is the count of the counter, MAX is the maximum signal level, MIN is the minimum signal level, and $\Delta V$ is the voltage value of the discharge circuit.

As described above, the minimum signal level of the discharge unit, detected by the maximum and minimum signal level detector 15, corresponds to the voltage value of the discharge unit 9 after discharging electricity over one clock of a pulse train. For the detection of the minimum signal level, for example, each time a smaller discharge voltage is obtained among the discharge voltages (voltages after discharging) of the discharge unit 9 obtained in the measurement of an object after the distance measuring apparatus of the present invention is operated, the value is stored and updated, and the minimum value obtained in this way can be used as a detected value (in the measurement which is performed many times per unit time at a high speed, there is the possibility that the discharge unit discharges electricity over time equivalent to just one clock of a pulse clock, so the value can be used as the minimum signal level). In the initial stage, the aforementioned predetermined span value may be used as the minimum value.

Thus, according to the first embodiment of the present invention, even if in the measurement of a propagation delay time the voltage for interpolating a count means having a large count cycle, such as a counter, varied due to an electric noise or the like, a variation in the distance to an object of measurement could be suppressed because the voltage is corrected at every measurement with the maximum and minimum values. This means that, even in the case where in FIGS. 2(A–D), like the prior art, a triangular wave AD varies as indicated by broken lines (in this embodiment the triangular wave has not been used) and time up to a certain level X varies as shown by L1, L2, and L3, the time can be accurately obtained according to the present invention, that a variation in the measured distance can thus be prevented, and that a measurement of distance can be made with a high degree of reliability.

Therefore, according to the first embodiment, a distance to an object of measurement can be accurately measured even in a case where the voltage level of the discharge unit varies due to noise or the like when the discharging of the discharge unit, which is interpolating the counter, is stopped.

While the first embodiment has been described with reference to the case where a single discharge unit is used, a plurality of discharge units may be used. In addition, the signal level detector 10 may be constructed such that it measures the voltage of the discharge unit, based on another timing pulse.

Second Embodiment

Figure 3:
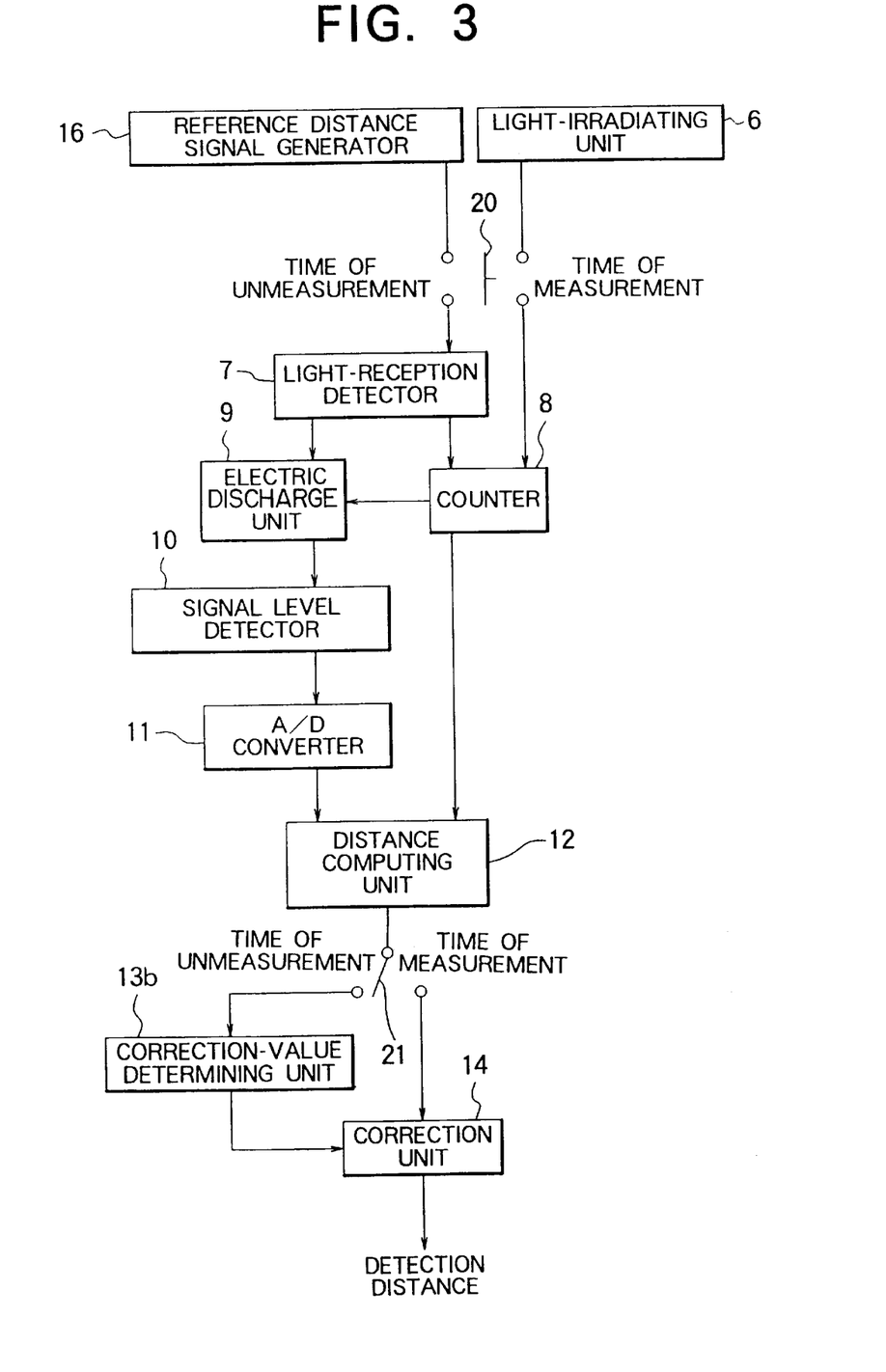
FIG. 3 is a block diagram showing a distance measuring apparatus of a second embodiment of the present invention.
Figure 4A:
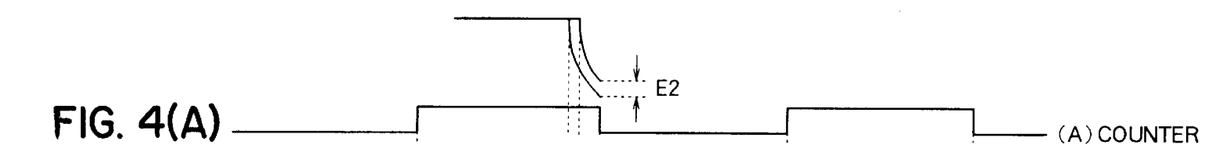
Figure 4B:
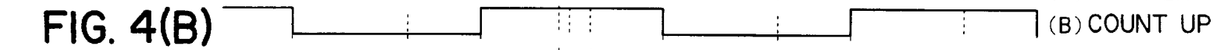
Figures 4C, 4D:
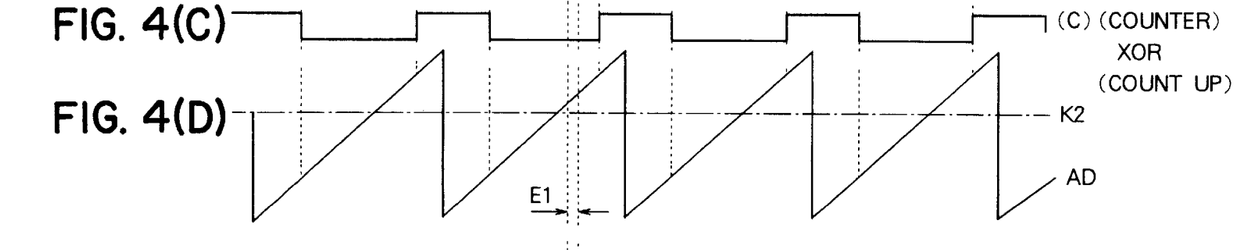
Figures 4E, 4F:
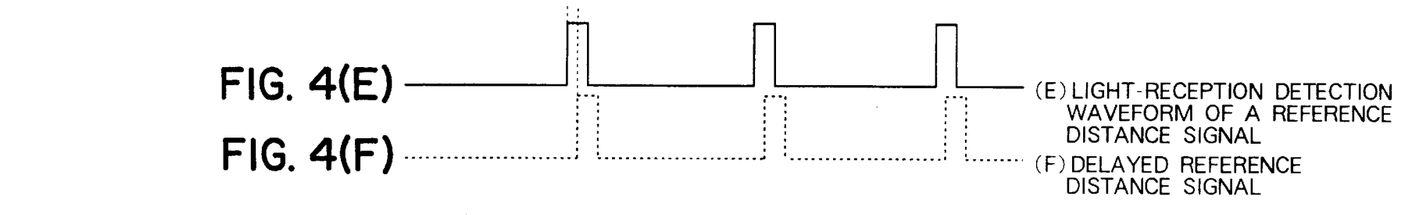

FIG. 3 shows a block diagram of a second embodiment of the present invention, and the same reference numerals as FIG. 1 denote the same parts as FIG. 1 or the corresponding parts of FIG. 1. The second embodiment is constructed such that the temperature of a discharge unit 9 is compensated with a reference distance signal having a fixed delay time. The second embodiment does not include the maximum and minimum signal level detector 15 shown in the first embodiment. Instead, a reference distance signal generator 16 is used, and the contents of a correction-value determining unit 13b are different from that of the first embodiment.

In FIG. 3, switches 20 and 21 are switched in synchronization with each other and are a means for switching the kind of a signal that is supplied to each unit, depending upon whether a distance to an object is being measured actually.

The operations of the second embodiment differ at the time that a measurement of distance is made and at the time that the distance measurement is not made. When the distance measurement is not made, a counter 8 is started at the time of the delay starting of a reference distance signal generated in the reference distance signal generator 16, and after a predetermined time, the reference distance signal is output to a light-reception detector 7. The light-reception detector 7 causes the counter 8 to output a count stop command. At the same time, the electric discharge in the discharge unit 9 is started. The subsequent operation from the discharge unit 9 to a distance computing unit 12 is the same as the first embodiment.

The distance, thus measured with the reference distance signal, should represent a fixed reference distance. Therefore, when the measured distance differs from the reference distance, a correction-distance determining unit 13b determines a correction value, based on the difference. The correction-distance determining unit 13b computes a difference between the measured distance based on the aforementioned reference distance signal and the reference distance, and then performs a correction by adding or subtracting the computed difference to or from the subsequent signal level of the discharge unit that is detected by the signal level detector.

FIGS. 4(A–F) are a timing diagram showing how the second embodiment is operated, and "A" to "AD" denote the same signals as FIG. 2. Also, in FIGS. 4(A–F) are "E" denotes a light-reception detection waveform of the reference distance signal and "F" represents a delayed reference distance signal. Considering now a case where the delay time obtained by the distance computing unit is delayed by E1 from the light-reception detection waveform of the reference distance signal shown by a solid line "E", the discharge start of the discharge unit 9 is at the rise time of the light-reception detection waveform and therefore the delay E1 of the light-reception detection signal can be removed by subtracting a voltage E2 from the voltage at the end time of the discharge of the discharge unit 9. In this way, the voltage E2 obtained with the reference distance signal at the time of the unreception of light is used in the interpolation computation at the time of the reception of light, and consequently, an accurate interpolation value can be obtained. Between the obtained delay time E1 of the light-reception detection signal with respect to the reference distance signal and the correction value E2 of the voltage at the end time of the discharge of the discharge unit 9, there is established a non-linear relationship, because the discharge curve is non-linear. Therefore, when E2 is obtained from E1, a numerical table, etc., are used.

When, on the other hand, a distance is measured, the operation from the light-irradiating unit 6 and the light-reception detector 7 to the distance computing unit 12 is the same as the first embodiment. With respect to the measured distance obtained in this way, the correction of an actual measurement of a distance to an object can be performed with the distance correcting value, which is determined with the aforementioned reference distance signal at the time when a measurement of distance is not made.

Therefore, even in a case where a propagation delay time is different from the original time due to environmental temperature change, a distance to an object can be accurately measured by making a correction in accordance with the second embodiment.

Third Embodiment

Figure 5:
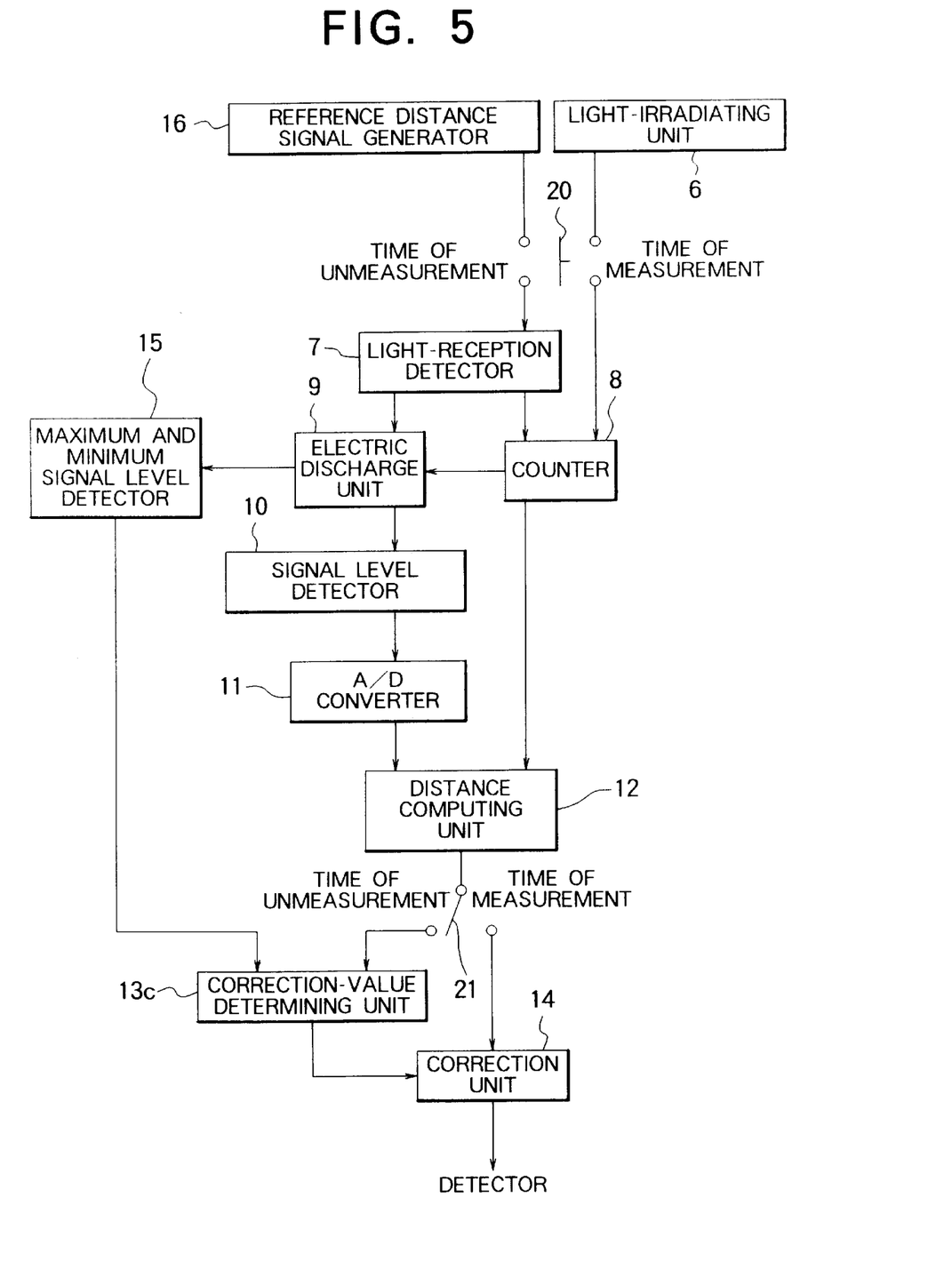
FIG. 5 is a block diagram showing a distance measuring apparatus of a third embodiment of the present invention.

FIG. 5 shows a block diagram of a distance measuring apparatus of a third embodiment of the present invention, in which a measurement of distance is performed by a combination of the first and second embodiments.

The same reference numerals as FIG. 5 denote the same parts as FIGS. 1 and 3 or the corresponding parts of FIGS. 1 and 3. But, a correction-value determining unit 13c is a correction-value determining unit where both the determination of the correction value of the first embodiment and the determination of the correction value of the second embodiment are performed.

The operation of the third embodiment will hereinafter be described. When a distance is measured, the correction-value determining unit 13c, as with the first embodiment, detects the maximum and minimum signal levels of a discharge unit 9 by using a maximum and minimum signal level detector 15, and based on the detected values, a correction value is determined. When a distance is not measured, as with the second embodiment, the determination of a correction value is performed by using a reference distance signal when a distance is not measured. Then, the distance to an object, obtained by the distance computing unit 12, is corrected with the aforementioned two correction values. The correction in the third embodiment is made by superimposing the correction values of the first and second embodiments.

Therefore, even in a case where the voltage level of the discharge unit varies due to noise or the like when the electric discharge of the discharge unit is stopped, or even when a propagation delay time differs from the original time due to environmental temperature change, a distance to an object can be accurately measured by correcting a measured distance in accordance with the third embodiment.

While the invention has been described with reference to specific embodiments thereof, it will be appreciated by those skilled in the art that numerous variations, modifications, and embodiments are possible, and accordingly, all such variations, modifications, and embodiments are to be regarded as being within the scope of the invention.

What is claimed is:

1. A distance measuring apparatus comprising:

a transmitter for transmitting an electromagnetic wave in a direction of an object;

a receiver for receiving an electromagnetic wave reflected by the object;

a counter, having a preset frequency, for measuring a propagation delay time by counting a number of pulses between the transmission of the electromagnetic wave and the reception of the reflected wave;

an electric discharger for generating an electric discharge when the receiver receives the reflected electromagnetic wave;

a discharge voltage detector for measuring a voltage of the electric discharge at a first count-up time after reception of the reflected wave; and a distance calculator for calculating a distance to the object based on the number of counted pulses and the discharge voltage measured by the discharge voltage detector.

2. The distance measuring apparatus as set forth in claim 1, further comprising:

maximum and minimum voltage detector for detecting a maximum voltage before said electric discharge of said electric discharger and detecting a minimum voltage or a value near said minimum voltage after the electric discharge when said electric discharger discharged electricity over one pulse of said pulse train; and corrector for correcting the distance computed by said distance calculator, based on the voltages detected by said maximum and minimum voltage detector.

3. The distance measuring apparatus as set forth in claim 2, wherein the maximum and minimum voltages which are detected by said maximum and minimum voltage detector are stored and updated.

4. The distance measuring apparatus as set forth in claim 1, wherein said electric discharger performs an electric discharge until the pulse of said pulse train is generated for the first time after said reflected wave is received by said receiver.

5. The distance measuring apparatus as set forth in claim 1, further comprising:

reference distance signal generator for generating a reference distance signal having a fixed delay time; and corrector for comparing a distance calculated by said distance calculator with said reference distance signal and correcting the distance calculated by said distance calculator based on a result of the comparison.

6. The distance measuring apparatus as set forth in claim 5, wherein the calculation of the distance based on said reference distance signal is performed when a measurement of distance to said object is not made.

* * * * *